US010552760B2

(12) United States Patent
Cmielowski et al.

(10) Patent No.: US 10,552,760 B2
(45) Date of Patent: Feb. 4, 2020

(54) TRAINING SET CREATION FOR CLASSIFYING FEATURES OF A SYSTEM UNDER AGILE DEVELOPMENT

(71) Applicant: International Business Machines Corporation, Armonk, NY (US)

(72) Inventors: Lukasz G. Cmielowski, Kraków (PL); Marek Franczyk, Bojszowy (PL); Tymoteusz Gedliczka, Kraków (PL); Andrzej J. Wrobel, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 951 days.

(21) Appl. No.: 14/973,860

(22) Filed: Dec. 18, 2015

(65) Prior Publication Data

US 2017/0178022 A1    Jun. 22, 2017

(51) Int. Cl.
 *G06N 20/00* (2019.01)
 *G06F 8/77* (2018.01)
 *G06Q 10/10* (2012.01)
 *G06F 11/00* (2006.01)

(52) U.S. Cl.
 CPC .............. *G06N 20/00* (2019.01); *G06F 8/77* (2013.01); *G06F 11/008* (2013.01); *G06Q 10/101* (2013.01)

(58) Field of Classification Search
 CPC .......... G06N 99/005; G06N 5/04; G06F 8/77; G06F 11/36; G06Q 10/101
 USPC ......................................................... 706/58
 See application file for complete search history.

(56) References Cited

U.S. PATENT DOCUMENTS

| 7,856,616 | B2 | 12/2010 | Chang et al. |
| 8,296,724 | B2 | 10/2012 | Lindley |
| 8,352,904 | B2 | 1/2013 | Hodges |
| 9,799,007 | B2 | 10/2017 | Blincoe et al. |
| 2012/0079449 | A1* | 3/2012 | Sanderson ........... G06Q 10/103 717/102 |

(Continued)

OTHER PUBLICATIONS

Andrew Meneely et al., "Predicting failures with developer networks and social network analysis", Proceedings of he 16th ACM SIGSOFT International Symposium on Foundations of software engineering, 2008, ACM.

(Continued)

*Primary Examiner* — Dave Misir
(74) *Attorney, Agent, or Firm* — Cantor Colburn LLP; Scott Dobson

(57) ABSTRACT

The disclosed herein relates to a method for failure rate prediction of a feature of a system under development. The method is executed by a processor coupled to a memory. The method includes defining a feature state of the feature during a predetermined time interval, the predetermined time interval being associated with a development stage of the system. The method also includes assigning a first defect class value to the feature for the predetermined time interval, the first defect class value configured to indicate a first condition and selecting, when a defect is reported for the feature, a second defect class value indicating a second condition, the second condition being associated with a higher failure rate than the first condition. The method can be embodied in system and a computer program product.

15 Claims, 3 Drawing Sheets

(56) References Cited

U.S. PATENT DOCUMENTS

| | | | |
|---|---|---|---|
| 2013/0311968 A1* | 11/2013 | Sharma | G06Q 10/06 717/101 |
| 2014/0053135 A1 | 2/2014 | Bird et al. | |
| 2014/0359555 A1* | 12/2014 | Holler | G06F 11/3684 717/101 |

OTHER PUBLICATIONS

Timo O.A. Lehtinen et al., "Perceived causes of software project failures—An analysis of their relationships", Information and Software Technology Journal, 2014, pp. 623-643, vol. 56, Issue 6, Elsevier.

* cited by examiner

TRAINING SET CREATION FOR CLASSIFYING FEATURES OF A SYSTEM UNDER AGILE DEVELOPMENT

BACKGROUND

The disclosure relates generally to training set creation for classifying features of a system under agile development.

In general, contemporary implementations of software development include a feature analysis tool to select and identify top risk items. The feature analysis tool can use finite state of a project and features, which identify whether the project is done and whether a state of each feature is known (e.g., correct or incorrect). If a defect in a particular feature is found, that feature is assigned to a 'BAD' class. Otherwise, that feature is assigned to an 'OK' class. However, because the features analysis tool only monitors a completed project, the feature analysis tool cannot identify when internal feature iterations fail. This is not acceptable for software development under an agile development model, which requires constant testing in parallel to development.

SUMMARY

According to one embodiment, the disclosed herein relates to a method for failure rate prediction of a feature of a system under development. The method is executed by a processor coupled to a memory. The method includes defining a feature state of the feature during a predetermined time interval, the predetermined time interval being associated with a development stage of the system. The method also includes assigning a first defect class value to the feature for the predetermined time interval, the first defect class value configured to indicate a first condition and selecting, when a defect is reported for the feature, a second defect class value indicating a second condition, the second condition being associated with a higher failure rate than the first condition. The method can be embodied in system and a computer program product.

Additional features and advantages are realized through the techniques. Other embodiments and aspects thereof are described in detail herein and are considered a part of embodiments herein. For a better understanding of the advantages and the features of embodiments herein, refer to the description and to the drawings.

BRIEF DESCRIPTION OF THE SEVERAL VIEWS OF THE DRAWINGS

The subject matter herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include a system, a method, and/or a computer program product (herein the system) that correlates feature states to finite period of time (e.g., iteration, week of development, sprint, etc.).

A feature can be a product feature/component of the system. Each product feature/component system can be represented by a feature index (e.g., name) and a finite state (e.g., period in time). For instance, a feature can be represented as Feature [i, j], where 'i' is a name of feature (e.g., identifier) and 'j' is a finite state (e.g., age).

The system also creates a training set for infinite state features (e.g., features in progress, features in development, or features that are not complete) to support failure prediction within development iterations and at the end of development. The system further determines if a feature in current state (e.g., under development) requires testing or not, which reduces a testing backlog and increases a testing efficiency.

Figure 1:
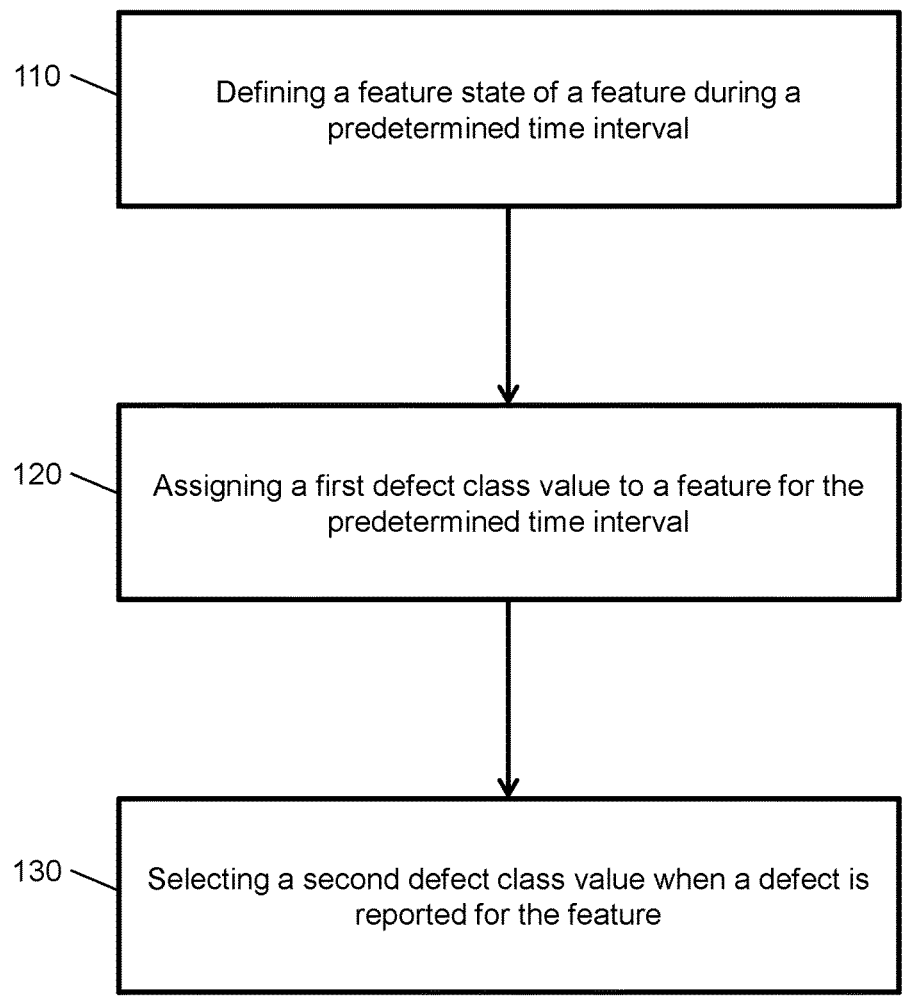
FIG. 1 illustrates a process flow of an example operation of a failure rate prediction of a feature in accordance with an embodiment.

Turning now to FIG. 1, a process flow 100 is generally shown in accordance with an embodiment. The process flow 100 is an example operation of a failure rate prediction of a feature of the system, which is under development.

The process flow 100 begins at block 110, where a feature state of the feature is defined during a predetermined time interval. Examples of feature states include, but are not limited to, under development, completed, pending review, etc. The predetermined time interval can be associated with a development stage of the system (e.g., as the system is being created on a code level such that the sum of its parts are not fully completed). At block 120, a first defect class value is assigned to the feature for the predetermined time interval. A class value is an alphanumerical value that indicates a condition (e.g., OK, BAD, etc.) of the feature (but it can also be boolean: true, false or numerical values: 0, 1). The first defect class value can be configured to indicate a first condition. At block 130, a second defect class value is selected when a defect is reported for the feature. The second defect class value can be configured to indicate a second condition. The second condition being associated with a higher failure rate than the first condition. The second defect class value can also be selected for a subsequent time interval where a change to the feature occurred. The change to the feature can correspond to the reported defect.

Figure 2:
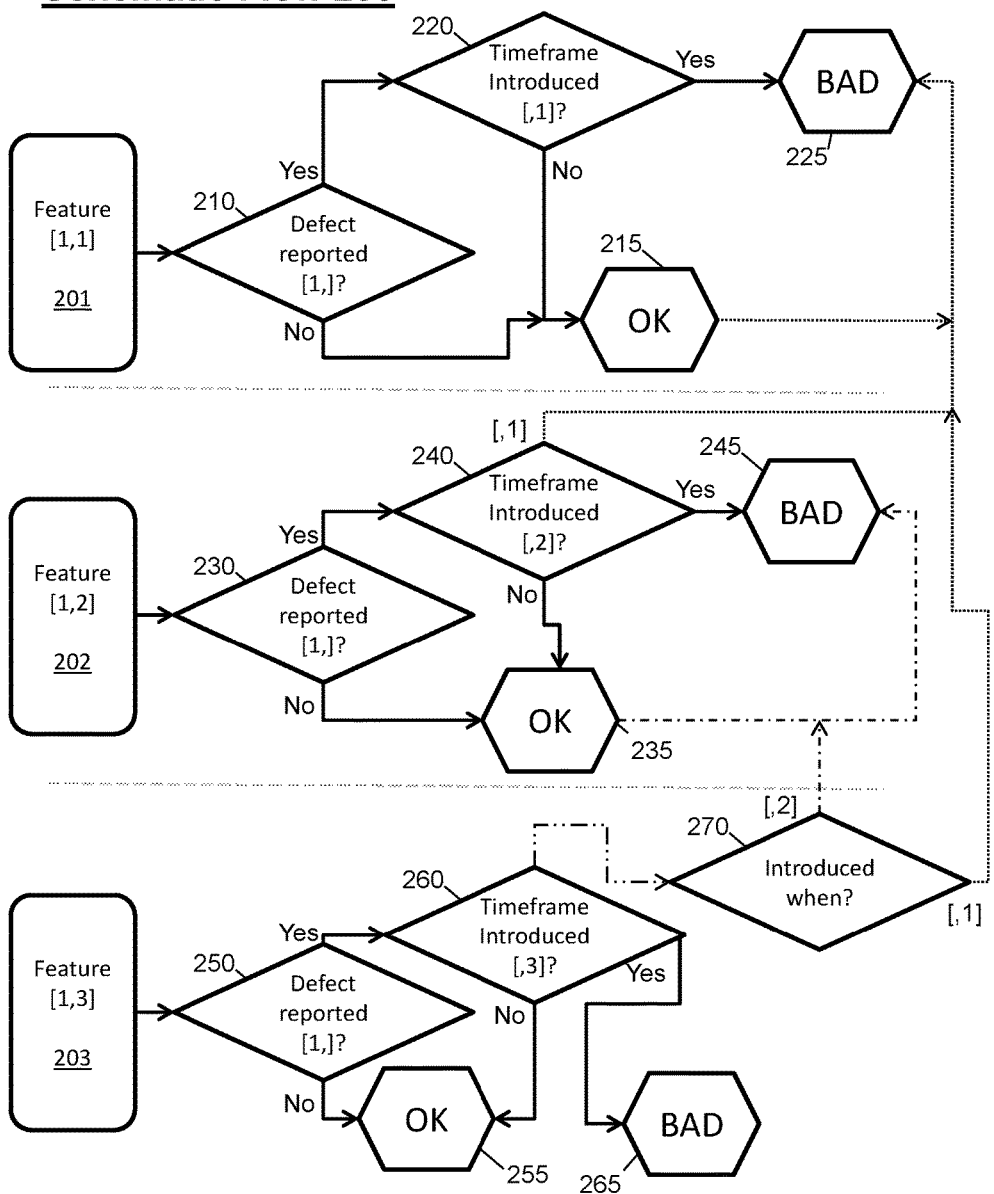
FIG. 2 illustrates a schematic flow of an example operation of a failure rate prediction of a feature in accordance with an embodiment.

In general, to classify features (e.g., assign a class value), a training set is created. Turning now to FIG. 2, a schematic flow 200 that illustrates operations for training set creation' is generally shown in accordance with an embodiment. The schematic flow 200 also illustrates operations for determining if a feature should belong to OK or BAD training set. The schematic flow 200 builds a rich training set for features under development and uses machine learning to improve testing process in parallel with development.

For instance, the schematic flow 200 divides each feature into finite states (iterations, sprints (e.g., code sprint), weeks). Note that a code sprint is a set amount of time, such as one to two days, a developer is allocated to write code. The schematic flow includes feature 1 developed across 3 sprints (e.g., features 201, 202, and 203, respectively identified as Feature[1, 1], Feature[1, 2], and Feature[1, 3]). Note that in Feature[1, 1], Feature[1,2], and Feature[1,3] the second digit represent finite state (i.e., sprint). Further, the schematic flow 200 can utilize and/or multiply historical data to enable a feature 1 analysis immediately in sprint 2 (e.g., no need to wait for feature completion).

For example, to test features in progress (e.g., still developed) or determine if a feature in current state requires testing or not, finite states are introduced as described above (e.g., to test a Feature[i, j], a Feature[i, j] is created to determine if a defect exists). If feature 1 in sprint 1 (e.g., Feature[1,1]) contains changes in class A.java (e.g., introduced in sprint 1), if a defect in the feature 1 in sprint 1 was found in sprint 2 (e.g., [, 2]), and if the feature 1 in sprint 1 was introduced/committed in sprint 1 (e.g., [, 1]), then Feature[1,1] is marked as BAD (e.g., assigned to BAD class).

Further, if a current sprint is sprint 2, then a finite Feature[1,1] (e.g., feature 1 developed in sprint 1) and an in-progress Feature[1,2] (e.g., the same feature further implemented in sprint 2) exist. Feature[1,1] is assigned to one of two classes: OK, BAD. If there are defects reported to feature 1 and introduced in sprint 1 (e.g., Feature[1,1]), then Feature[1,1] is assigned to BAD class as noted above. Otherwise, the Feature[1,1] is assigned to OK class. If there are defects reported to feature 1 and introduced in sprint 2 (e.g., Feature[1,2]), then feature[1,2] is assigned to BAD class. Otherwise, the Feature[1,2] is assigned to OK class.

With respect to FIG. 2, the schematic flow 200 begins at decision block 210 while feature 202 is in progress to determine if a defect is reported in feature 201. As indicated by the 'No' arrow, if the defect is not reported then the schematic flow 200 assigns an 'OK' class to feature 201 at block 215. As indicated by the 'Yes' arrow, if the defect is reported then the schematic flow 200 proceed to block 220.

At block 220, the schematic flow 200 determines if timeframe associated with the defect is related to sprint 1. As indicated by the 'No' arrow, if the timeframe associated with the defect is not related to sprint 1 then the schematic flow 200 assigns an 'OK' class to feature 201 at block 215. As indicated by the 'Yes' arrow, if the timeframe associated with the defect is related to sprint 1 then the schematic flow 200 assigns an 'BAD' class to feature 201 at block 225.

Similarly, the schematic flow 200 can start at decision block 230 while feature 203 is in progress to determine if a defect is reported in feature 202. As indicated by the 'No' arrow, if the defect is not reported then the schematic flow 200 assigns an 'OK' class to feature 202 at block 235. As indicated by the 'Yes' arrow, if the defect is reported then the schematic flow 200 proceed to block 240.

At block 240, the schematic flow 200 determines if timeframe associated with the defect is related to sprint 2. As indicated by the 'No' arrow, if the timeframe associated with the defect is not related to sprint 2 then the schematic flow 200 assigns an 'OK' class to feature 202 at block 235. As indicated by the 'Yes' arrow, if the timeframe associated with the defect is related to sprint 2 then the schematic flow 200 assigns an 'BAD' class to feature 202 at block 245. Note that if the timeframe associated with the defect is not related to sprint 2 but is related to sprint 1, then the schematic flow 200 can re-assign the 'BAD' class to feature 201 at block 225, as indicated by the dotted arrows of FIG. 2.

Also, the schematic flow 200 can start at decision block 250 after the project is complete to determine if a defect is reported in feature 203. As indicated by the 'No' arrow, if the defect is not reported then the schematic flow 200 assigns an 'OK' class to feature 203 at block 255. As indicated by the 'Yes' arrow, if the defect is reported then the schematic flow 200 proceed to block 260.

At block 240, the schematic flow 200 determines if timeframe associated with the defect is related to sprint 3. As indicated by the 'No' arrow, if the timeframe associated with the defect is not related to sprint 3 then the schematic flow 200 assigns an 'OK' class to feature 203 at block 255. As indicated by the 'Yes' arrow, if the timeframe associated with the defect is related to sprint 3 then the schematic flow 200 assigns an 'BAD' class to feature 203 at block 265. Note that if the timeframe associated with the defect is not related to sprint 3 but is related to another sprint (e.g., 1 or 2), then the schematic flow 200 can re-assign the 'BAD' class to a corresponding feature. That is, the double-dotted and dashed arrow leads to block 270, where the timeframe is determined with respect to the defect. If the timeframe associated with the defect is related to sprint 1, then the schematic flow 200 can re-assign the 'BAD' class to feature 201 at block 225, as indicated by the dotted arrows of FIG. 2. If the timeframe associated with the defect is related to sprint 2, then the schematic flow 200 can re-assign the 'BAD' class to feature 202 at block 245, as indicated by the dot-dashed arrows of FIG. 2.

Figure 3:
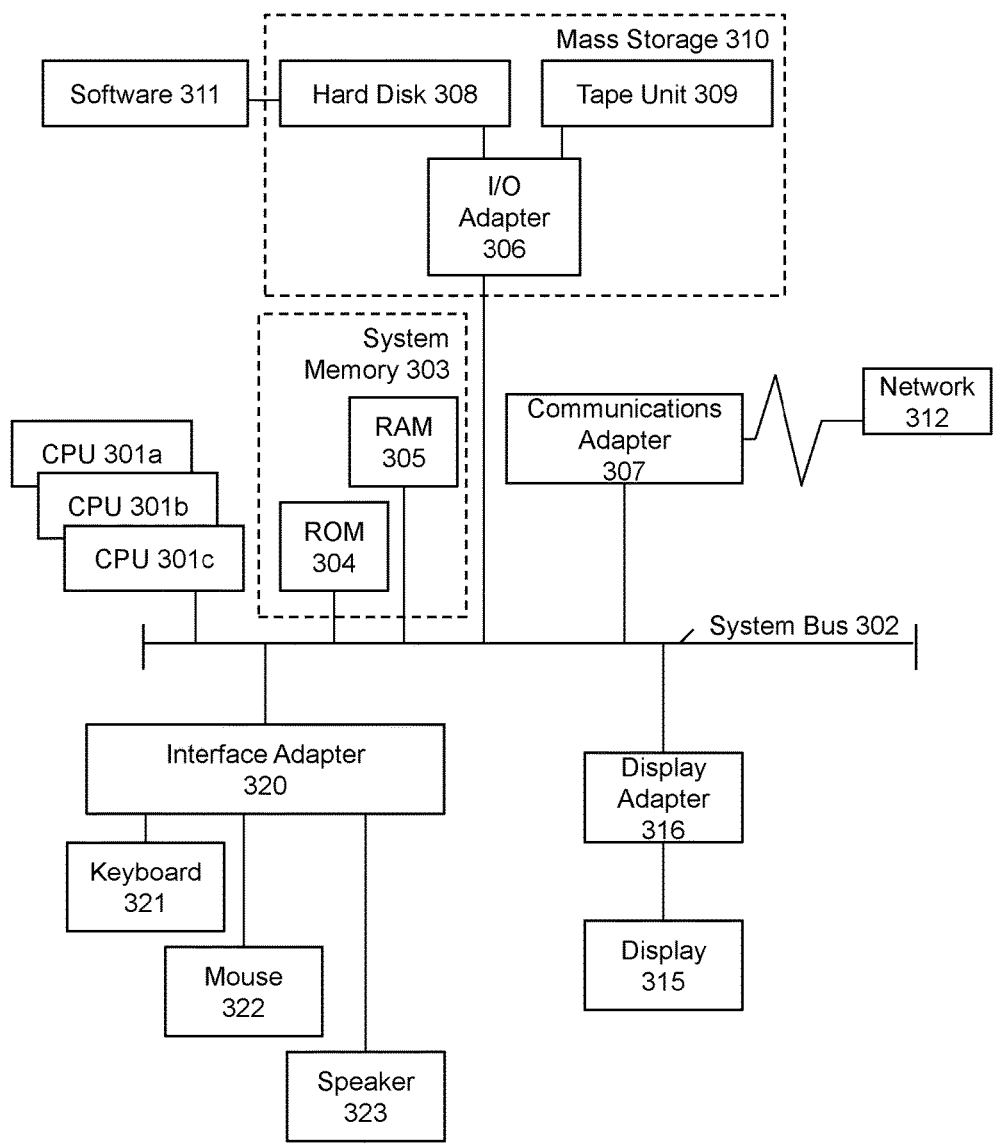
FIG. 3 illustrates a processing system in accordance with an embodiment.

Referring now to FIG. 3, there is shown an embodiment of a processing system 300 for implementing the teachings herein. In this embodiment, the processing system 300 has one or more central processing units (processors) 301a, 301b, 301c, etc. (collectively or generically referred to as processor(s) 301). The processors 301, also referred to as processing circuits, are coupled via a system bus 302 to system memory 303 and various other components. The system memory 303 can include read only memory (ROM) 304 and random access memory (RAM) 305. The ROM 304 is coupled to system bus 302 and may include a basic input/output system (BIOS), which controls certain basic functions of the processing system 300. RAM is read-write memory coupled to system bus 302 for use by processors 301.

FIG. 3 further depicts an input/output (I/O) adapter 306 and a network adapter 307 coupled to the system bus 302. I/O adapter 306 may be a small computer system interface (SCSI) adapter that communicates with a hard disk 308 and/or tape storage drive 309 or any other similar component. I/O adapter 306, hard disk 308, and tape storage drive 309 are collectively referred to herein as mass storage 310. Software 311 for execution on processing system 300 may be stored in mass storage 310. The mass storage 310 is an example of a tangible storage medium readable by the processors 301, where the software 311 is stored as instructions for execution by the processors 301 to perform a method, such as the process flows above. Network adapter 307 interconnects system bus 302 with an outside network 312 enabling processing system 300 to communicate with other such systems. A screen (e.g., a display monitor) 315 is connected to system bus 302 by display adapter 316, which may include a graphics controller to improve the performance of graphics intensive applications and a video controller. In one embodiment, adapters 306, 307, and 316 may be connected to one or more I/O buses that are connected to system bus 302 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 302 via an interface adapter 320 and the display adapter 316. A keyboard 321, mouse 322, and speaker 323 can be interconnected to system bus 302 via interface adapter 320, which may include, for example, a Super I/O chip integrating multiple device adapters into a single integrated circuit.

Thus, as configured in FIG. 3, processing system 305 includes processing capability in the form of processors 301, and, storage capability including system memory 303 and mass storage 310, input means such as keyboard 321 and mouse 322, and output capability including speaker 323 and display 315. In one embodiment, a portion of system memory 303 and mass storage 310 collectively store an operating system, such as the z/OS or AIX operating system from IBM Corporation, to coordinate the functions of the various components shown in FIG. 3.

Technical effects and benefits providing failure prediction within development iterations and at the end of development by creating a training set for infinite state features and reducing a testing backlog and increasing a testing efficiency by determining if a feature in current state requires testing or not. Thus, embodiments described herein are necessarily rooted in the system to perform proactive operations to overcome problems specifically arising in the realm of software development under an agile development model (e.g., these problems include the not being able to identify whether an iteration is defective prior to completion of the product, resulting in unwanted costs and expenses). Thus, embodiments here can base predictions/classifications to determine if current feature state requires additional testing and/or contains hidden defects without waiting for feature implementation end or historical data population.

Embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the embodiments herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating training sets for failure rate prediction of a feature of a system under, and in parallel with development, the method executed by a
    processor coupled to a memory, comprising:
    defining, by the processor, a finite state of the feature during a respective predetermined time interval of a plurality of predetermined time intervals, each predetermined time interval being associated with a respective development stage of the system;
    assigning, by the processor, a first defect class value to the feature for a first predetermined time interval of the plurality of predetermined time intervals, the first defect class value configured to indicate a first condition; and
    designating the finite state for the first predetermined time interval to a first condition training set for a machine learning algorithm;
    assigning, by the processor and when a defect is reported for the feature during a second predetermined time interval of the plurality of predetermined time interval, of at least one iteration, a second defect class value indicating a second condition, the second condition being associated with a higher failure rate than the first condition;
    designating the finite state for the second predetermined time interval to a second condition training set; and
    training a machine learning algorithm using the first condition training set and the second condition training set and determining by the trained machine learning algorithm the failure rate prediction for the system within development iterations of the system and at the end of the development.

2. The method of claim 1, the selecting of the second defect class value
    further comprising:
    receiving, for a subsequent time interval where a change to the feature occurred, the second defect class value.

3. The method of claim 2, wherein the change to the feature corresponds to the defect.

4. The method of claim 1, wherein the feature is a product component of the system.

5. The method of claim 1, wherein the feature is represented by a feature index and a finite state.

6. A computer program product, the computer program product comprising a computer readable storage medium having program instructions for creating a training set for failure rate prediction of a feature of a system under, and in parallel with development embodied therewith, the program instructions executable by a processor to cause the processor to perform:
    defining a finite state of the feature during a respective predetermined time interval of a plurality of time intervals, each predetermined time interval being associated with a respective development stage of the system;
    assigning a first defect class value to the feature for a first predetermined time interval of the plurality of predetermined time intervals, the first defect class value configured to indicate a first condition; and
    designating the finite state for the first predetermined to a first condition training set for a machine learning algorithm;
    assigning, when a defect is reported for the feature during a second predetermined time interval of the plurality of predetermined time intervals, of at least one iteration, a second defect class value indicating a second condition, the second condition being associated with a higher failure rate than the first condition;
    designating the finite state for the second predetermined to a second condition training set for a machine learning algorithm;
    training a machine learning algorithm using the first condition training set and the second condition training set and determining by the trained machine learning algorithm the failure rate prediction for the system within development iterations of the system and at the end of the development.

7. The computer program product of claim 6, wherein with respect to the selecting of the second defect class value the program instructions are further executable by
    the processor to cause:
    receiving, for a subsequent time interval where a change to the feature occurred, the second defect class value.

8. The computer program product of claim 7, wherein the change to the feature corresponds to the defect.

9. The computer program product of claim 6, wherein the feature is a product component of the system.

10. The computer program product of claim 6, wherein the feature is represented by a feature index and a finite state.

11. A system, comprising a processor and a memory storing program instructions for creating a training set for failure rate prediction of a feature of a system under, and in parallel with development thereon, the program instructions executable by a processor to cause the system to perform:
    defining a feature state of the feature during a respective predetermined time interval of a plurality of predetermined time intervals, each predetermined time interval being associated with a respective development stage of the system;

assigning a first defect class value to the feature for a first predetermined time interval, the first defect class value configured to indicate a first condition; and designating the finite state for the first predetermined to a first condition training set for a machine learning algorithm;

assigning, when a defect is reported for the feature during a second predetermined time interval of the plurality of predetermined time intervals, of at least one iteration, a second defect class value indicating a second condition, the second condition being associated with a higher failure rate than the first condition;

designating the finite state for the second predetermined to a second condition training set for a machine learning algorithm; and training a machine learning algorithm using the first condition training set and the second condition training set and determining by the trained machine learning algorithm the failure rate prediction for the system within development iterations of the system and at the end of the development.

12. The system of claim 11, wherein with respect to the selecting of the second defect class value the program instructions are further executable by the processor to cause the system to perform:

receiving, for a subsequent time interval where a change to the feature occurred, the second defect class value.

13. The system of claim 12, wherein the change to the feature corresponds to the defect.

14. The system of claim 11, wherein the feature is a product component of the system.

15. The system of claim 11, wherein the feature is represented by a feature index and a finite state.

* * * * *